Figure 1:
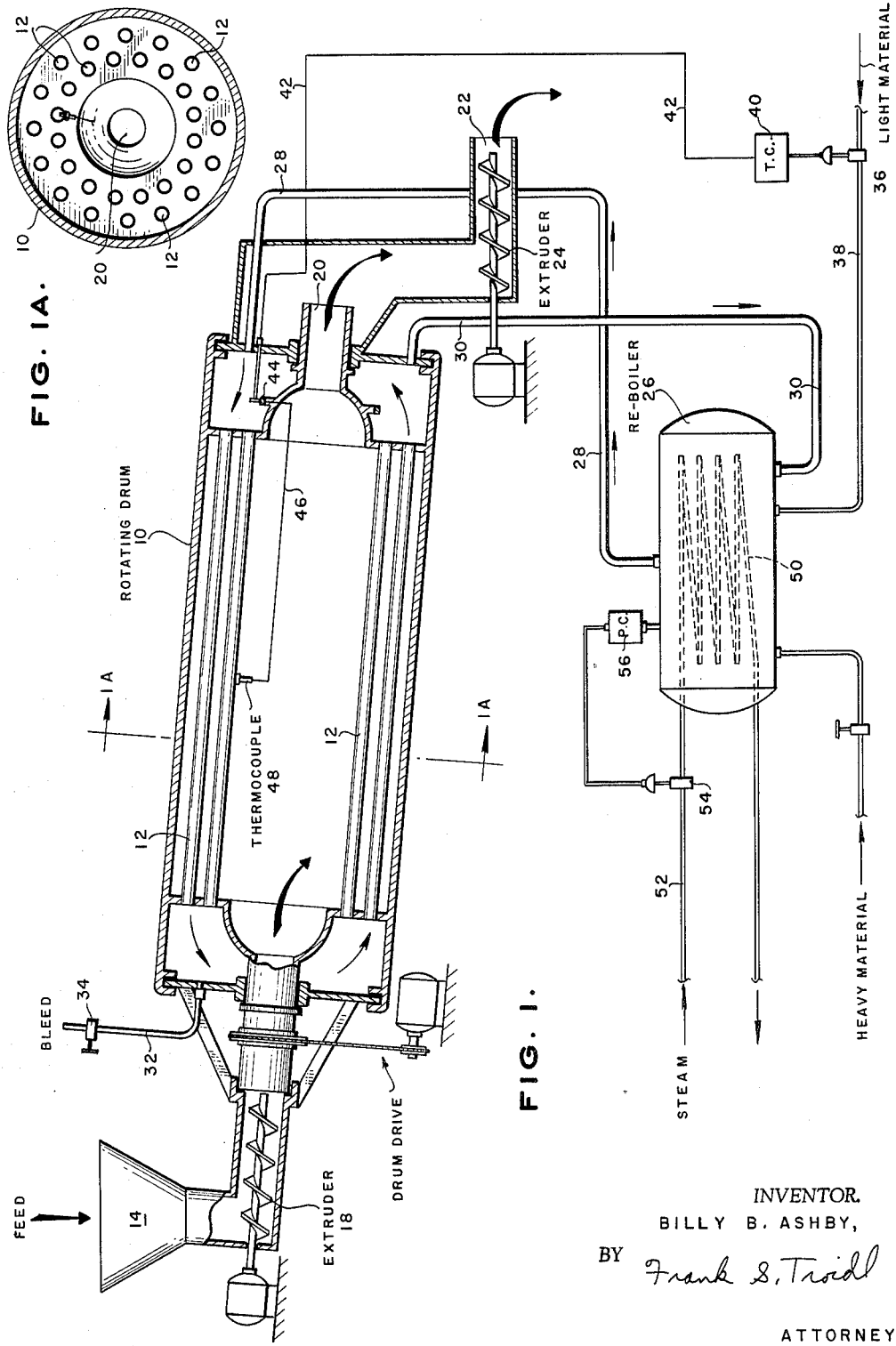

May 31, 1966  B. B. ASHBY  3,253,343
METHOD FOR DRYING PARTICULATE MATERIALS
Filed Nov. 1, 1963  2 Sheets-Sheet 2

INVENTOR.
BILLY B. ASHBY,
BY *Frank S. Troidl*

ATTORNEY.

United States Patent Office 3,253,343
Patented May 31, 1966

3,253,343
METHOD FOR DRYING PARTICULATE MATERIALS
Billy B. Ashby, Baytown, Tex., assignor, by mesne assignments, to Esso Research and Engineering Company, Elizabeth, N.J., a corporation of Delaware
Filed Nov. 1, 1963, Ser. No. 320,898
2 Claims. (Cl. 34—4)

This invention relates to the drying of particulate materials. More particularly, this invention is an improved method for drying particulate materials by the use of vapors in indirect heat exchange contact with the particulate materials being dried.

The usual practice in drying particulate materials is to flow the materials to be dried through a dryer. An inert gas is normally introduced in direct contact with the particulate materials to sweep away vapor formed during the drying operation. Steam is flowed through the dryer in indirect heat exchange contact with the particulate materials to be dried. The steam condenses inside tubes running the length of the dryer. The material to be dried comes in direct contact with the outside of these tubes. Thus, the heat required for drying is given up by the condensing steam, flows by conduction through the tube walls, and is transferred by conduction and convection from the outside surface of the tubes to the wet material. However, with the use of steam, the condensing temperature inside the tubes and, thus, the tube surface temperature is virtually constant along the entire length of the dryer. The drying capacity of a dryer is a function of the temperature of this heat exchange surface. In general, the higher the temperature, the higher the drying capacity so long as fouling of the indirect heat exchange contact surfaces does not occur.

In many cases, the maximum temperature permissible is limited by the melting point of the material being dried. The melting point often depends on the wetness or percentage of volatiles in the material. The greater the liquid content of the material, the lower the temperature must be to avoid fouling. Since the material entering the upper end of the dryer in most drying systems is relatively wet and the material leaving the lower end is relatively dry, the maximum allowable temperature varies considerably along the length of the drier. For example, in drying a hydrocarbon solvent from polypropylene, the maximum allowable temperature varies from 180° F. at the inlet to 260° F. at the outlet.

From the foregoing, it is clear that for certain materials, the temperature must vary along the length of the dryer (being higher at the lower end) in order that maximum drying capacity may be achieved.

Briefly described, my new method for drying a particulate material utilizes an inclined tube dryer. The particulate material is fed through the dryer from the higher end. A mixture of vapors is fed into the dryer tubes from the lower end of the drier in indirect heat exchange with the particulate material. Each of the components of the vaporous mixture has a different boiling point. The ratios of the components of the vaporous mixture are controlled as well as the condensing pressure of the vapors in order to control the temperature gradient along the tubes of the inclined dryer.

Figure 2:
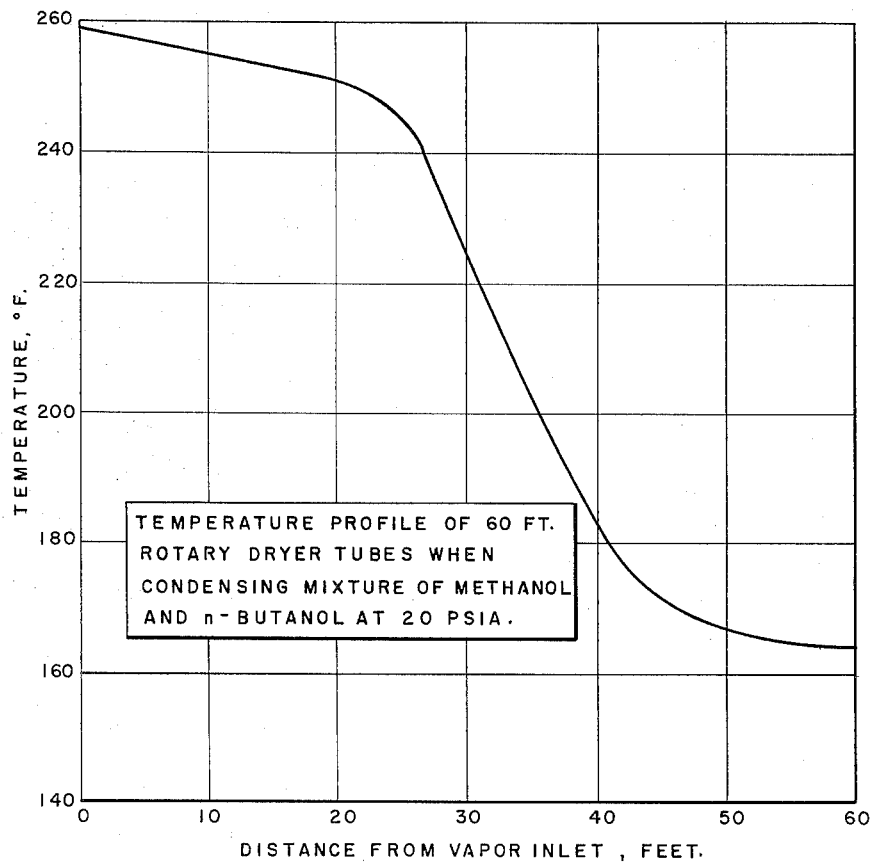

The invention, as well as its many advantages, will be further understood by reference to the following detained description and drawings in which:

FIG. 1 is a simplified diagram showing the basic equipment;
FIG. 1A is a sectional view taken along the line 1A—1A of FIG. 1; and
FIG. 2 is a typical tube-temperature profile when condensing a mixture of methanol and n-butanol at 20 p.s.i.a.

Referring to FIGS. 1 and 1A, an inclined tube rotary dryer including a rotating drum 10 is used to dry the wet, particulate material. A plurality of tubes 12 is mounted within the rotating drum 10. The tubes 12 extend longitudinally through a major portion of the rotating drum 10.

The wet, particulate material is fed into feed hopper 14 and then into the rotating drum by means of a motor-operated screw extruder 18. The dried, particulate material leaves the dryer at exit 20. The dried, particulate material is conveyed from the outlet 22 by a motor-operated screw extruder 24. If desired, an inert gas can be used to remove the dried, particulate material.

The mixture of vapors containing components with different boiling points is fed into the lower end of the inclined dryer from a reboiler 26 by means of a vapor line 28. The lightest component of the vaporous mixture tends to concentrate and condense in the upper end of the tubes 12 at a relatively low temperature, while the heaviest component tends to concentrate and condense in the lower end of the tubes 12 at a higher temperature. The condensate drains down the tubes 12 countercurrent to the vapor flow. The condensate is fed back to the reboiler 26 by means of the condensate line 30. Light material can be bled from the upper end of the tubes through bleed valve 34. It is then condensed in a small auxiliary condenser and stored for recycling to the reboiler 26.

The temperature gradient along the length of the dryer is determined, among other things, by the volatilities of the components in the mixture, the length of the tubes 12, and the amount of light and heavy materials in the tubes 12. The temperature gradient can be controlled automatically by:

(1) Bleeding off light material from the upper end of the dryer;
(2) Adding light material to the reboiler; or
(3) Changing the condensing pressure.

Light materials can be bled off from the upper part of the inclined dryer by means of bleed line 32 controlled by bleed valve 34.

The addition of light material to the reboiler 26 is controlled by an automatically operated valve 36 in light material line 38. The valve 36 is operated by temperature controller 40. The temperature controller 40 is, in turn, connected by means of electrical lead 42, slip ring 44 mounted in the rotating drum 10, and electrical lead 46 extending to a temperature-sensing means such as a thermocouple 48 extending into one of the tubes 12. When the temperature detected by the thermocouple 48 exceeds a predetermined set point, the valve 36 is opened slightly to admit light material to the reboiler 26. When the temperature drops below the set point, the valve 36 is closed.

The pressure of, say, 20 p.s.i.a. within the inclined tubes may be held relatively constant by controlling the steam rate to the reboiler 26. The steam is fed to the coils 50 of reboiler 26 by means of steam line 52 controlled by valve 54. A pressure control 56 is mounted on the reboiler 26. The temperature within the tubes 12 of the inclined dryer is a function of the pressure of reboiler 26 which, in turn, is a function of the flow rate of the steam fed to the reboiler.

FIG. 2 is a typical tube-temperature profile obtained by flowing a mixture of methanol and n-butanol through a 60-foot rotary drier at 20 p.s.i.a. Methanol boils at a temperature of 164° F. at 20 p.s.i.a. The boiling point of n-butanol at 20 p.s.i.a. is 259° F. The mixture of methanol and n-butanol condensed in the rotary drier consists of 45 percent methanol and 55 percent n-butanol.

Mixtures of two or more components consisting of vaporous materials other than methanol and n-butanol can be used in practicing my new method. For example, a mixture of hexane and 2-methylheptane can be used instead of the mixture of methanol and n-butanol. Hexane boils at 170° F. at 18 p.s.i.a., and 2-methylheptane boils at 260° F. at 18 p.s.i.a.

The particular mixture used in a particular drying operation and the condensing pressure depend, among other things, on the material to be dried and the temperature profile desired.

I claim:

1. A method of drying a particulate material in an inclined dryer comprising the steps of: feeding the particulate material through the dryer from the higher end; and feeding a mixture of vapors containing at least two components having different boiling points into the lower end of the inclined dryer and in indirect heat exchange with the particulate material at controlled ratios and controlled condensing pressure to control the temperature gradient along the inclined dryer.

2. A method of drying a particulate material in an inclined dryer comprising the steps of: feeding the particulate material through the dryer from the higher end; feeding a mixture of vapors containing at least two components having different boiling points into the lower end of the inclined dryer and in indirect heat exchange with the particulate material at controlled ratios and controlled condensing pressure to control the temperature gradient along the inclined dryer; removing the condensate from the inclined dryer; vaporizing said condensate; and recycling the vapors to the inclined dryer.

References Cited by the Examiner

UNITED STATES PATENTS

| | | | |
|---|---|---|---|
| 2,350,934 | 6/1944 | Schutte | 34—4 X |
| 2,471,325 | 5/1949 | Hickman | 34—5 |
| 3,174,229 | 3/1965 | Stokes et al. | 34—5 X |

WILLIAM F. O'DEA, *Primary Examiner.*

JOHN J. CAMBY, *Assistant Examiner.*